United States Patent Office 3,661,939
Patented May 9, 1972

3,661,939
PROCESS FOR THE PRODUCTION OF
VITAMIN $D_3$
Masashi Toyoda, Kawagoe-shi, and Yoshiyuki Tawara, Fukuoka-machi, Japan, assignors to Nisshin Flour Milling Co., Ltd., Tokyo, Japan
No Drawing. Filed Dec. 14, 1970, Ser. No. 98,204
Claims priority, application Japan, Dec. 16, 1969, 44/100,628
Int. Cl. C07c 171/10
U.S. Cl. 260—397.2
6 Claims

ABSTRACT OF THE DISCLOSURE

A process for producing vitamin $D_3$ or its acylate characterized by irradiating a solution of a 7-dehydrocholesterol acylate with ultraviolet rays so as to be photoisomerized to produce a previtamin $D_3$ acylate.

---

The present invention relates to a process for the production of vitamin $D_3$ and more particularly to a process for the production of a mixture containing vitamin $D_3$.

Conventionally, vitamin $D_3$ has been produced by an irradiation of 7-dehydrocholesterol with ultraviolet ray in an organic solvent. In such process, however, there are disadvantages that the solubility of 7-dehydrocholesterol in the organic solvent is small and as a result an effective irradiation of ultraviolet ray of 7-dehydrocholesterol can not be utilized and also can not industrially be carried out at an advantageous concentration of 7-dehydrocholesterol in the organic solvent.

Because of these disadvantages, there has hithertobefore been used ether which comparatively well dissolves 7-dehydrocholesterol as the organic solvent in a large amount. However, the solubility of 7-dehydrocholesterol in ethyl ether is only about 2% by weight.

An object of the present invention is to provide a process for the production of a mixture containing vitamin $D_3$ wherein the foregoing disadvantages can be eliminated.

Another object of the present invention is to provide a process for the production of a mixture containing vitamin $D_3$ wherein the irradiation of ultraviolet ray can be effectively and industrially carried out.

The present invention is a process for the production of a mixture containing vitamin $D_3$ wherein a solution of 7-dehydrocholesterol organic acid ester in an organic solvent is irradiated with ultraviolet ray to obtain a mixture containing previtamin $D_3$ organic acid ester and then said mixture containing previtamin $D_3$ organic acid ester is subjected to a saponification and heating operations to obtain a mixture containing vitamin $D_3$.

According to the process of the present invention, there is applied a phenomenon that when 7-dehydrocholesterol organic acid ester is irradiated with ultraviolet ray it photoisomerizes to previtamin $D_3$ organic acid ester. The 7-dehydrocholesterol organic acid ester has been obtained as an intermediate for the production of 7-dehydrocholesterol is different from 7-dehydrocholesterol in the properties and has characteristics that it is high in the solubility in organic solvent and is also high in the stability against oxygen in air.

According to the process of the present invention, not only a solvent lower in the danger of causing fire can be selected instead of ether but also the solubility increases and therefore it has become possible to carry out the ultraviolet ray irradiation at an industrially advantageous concentration because the ultraviolet ray can be utilized at a high degree.

As examples of the solvents which may be used in the process of the present invention there are mentioned n-hexane, ligroin, cyclohexane, ethyl ether, isopropyl ether, benzene and the like. For example, the solubility of 7-dehydrocholesterol in n-hexane is about 1% weight/volume but that of 7-dehydrocholesteryl acetate reaches to more than about 10% weight/volume. Further 7-dehydrocholesterol organic acid ester is not sensible to be oxidized than 7-dehydrocholesterol and therefore are advantages that it is not always necessary to use an inert gas in the case of irradiating it with ultraviolet ray and that, after the reaction, in the case of removing the unreacting 7-dehydrocholesterol organic acid ester, the by-produced lumisterol organic acid ester is simultaneously removed as crystals. In the conventional process, the removal of lumisterol which is a by-product requires a complicated operation and has been one of the problems in the industrialization of vitamin $D_3$. When the mixture of the crystalline 7-dehydrocholesterol organic acid ester and lumisterol organic acid ester is again irradiated with ultraviolet ray, it is isomerized to a previtamin $D_3$ organic acid ester.

Therefore, according to the process of the present invention, it is possible to carry out the reaction at a suitable concentration by using a solvent which is lower in the danger of fire than in the conventional irradiation of 7-dehydrocholesterol with ultraviolet ray, further there is an advantage that the purification step after the ultraviolet ray irradiation is simplified and it has first become possible to produce vitamin $D_3$ industrially and advantageously.

The 7-dehydrocholesterol organic acid ester to be used as a raw material is derived from a cholesterol organic acid ester by a known process. (For example, refer to W. R. Ness, R. S. Kostic and E. Mosettig "J. Am. Chem. Soc." 78, 436, 1956; H. Hunziker and F. X. Müllner "Helo. Chim. Acta" 41, 70, 1958). For the ester is used aliphatic esters such as an acetate, propionate or butyrate or aromatic esters such as a benzoate.

The reaction product, namely the mixture containing previtamin $D_3$ organic acid ester which is obtained by irradiating the solution of 7-dehydrocholesterol organic acid ester in organic solvent with ultraviolet and in which a precipitated crystalline substance is removed is subjected to a saponification operation by the use of alkali such as alkali hydroxide, barium hydroxide and the like and also to a heating operation (thermal-isomerization operation), thereby a mixture containing vitamin $D_3$ is obtained. The mixture is an oily matter.

The saponification operation is preferably carried out at normal temperature, but a higher or lower temperature may be used.

The heating operation may be carried out at the temperature at which previtamin $D_3$ is converted into vitamin $D_3$ in a well known method [K. H. Honewldt et al. "Rec. trav. Chim." 81, 1003 (1961)].

In the saponification and heating operations of the process of the present invention, the saponification may be firstly carried out and secondly the heating may be carried out, or the heating may be first carried out and secondly the saponification may be carried out.

The oily mixture containing vitamin $D_3$ may be used as an additive for a feed. Of course, the oily mixture containing vitamin $D_3$ may be treated by a well known method as described in for example U.S. Pat. Nos. 3,367,590 and 3,968,535.

The present invention is illustrated by the following examples.

EXAMPLE 1

5 g. of 7-dehydrocholesteryl acetate (prepared by known method) were dissolved in 500 ml. of n-hexane. This solution was irradiated with ultraviolet ray by re-cyclicly passing it through a quartz apparatus surrounding 450 w. high pressure mercury vapor lamps for 80 minutes.

After the irradiation and then the distillating off of n-hexane the solution was added with 50 ml. of ethanol and then the ethanolic solution was left to stand overnight at the temperature of −20° C. The formed crystals were filtered off from the ethanolic solution and the filtrate was heated at the temperature of 78° C. for 4 hours. After the cooling of the filtrate, the cooled filtrate was added with 4 ml. of ethanolic solution containing 0.7 g. of potassium hydroxide to effect a reaction at the temperature of 20° C. and under a nitrogen atmosphere for 60 minutes. The reaction product was added with 0.7 ml. of glacial acetic acid and then ethanol was distilled off under a reduced pressure from the reaction product. The obtained residue was extracted with 50 ml. of n-hexane and the extract was washed with water and n-hexane was distilled off from the extract to obtain 2.5 g. of yellow oily matter containing vitamin $D_3$.

The content of vitamin $D_3$ in the yellow oily matter was 40.2% by weight.

EXAMPLE 2

30 g. of 7-dehydrochlolesteryl acetate (prepared by known method) were dissolved in 1,500 ml. of ethyl ether. This solution was irradiated with ultraviolet ray by recyclicly passing it through a quartz apparatus surrounding 450 w. high pressure mercury vapor lamps for 7 hours. After the irradiation and then the distillating off of ethyl ether the solution was added with 150 ml. of ethanol and then the ethanolic solution was left to stand overnight at the temperature of 5° C. The formed crystals were filtered off from the ethanolic solution. The filtrate was added with 25 ml. of ethanolic solution containing 4.5 g. of potassium hydroxide to effect a reaction at the temperature of 20° C. for 60 minutes. The reaction product was added with 4.5 ml. of glacial acetic acid and then ethanol was distilled off under a reduced pressure. The residue was extracted with 300 ml. of isopropyl ether and the extract was washed with water. After the dehydration of the extract, the extract was boiled for 7 hours to obtain 17.9 . of oily matter containing vitamin $D_3$.

The content of vitamin $D_3$ in the oily matter was 35.5% by weight.

EXAMPLE 3

Example 1 was repeated except that 5 g. of 7-dehydrochloresteryl benzoate were dissolved in 500 ml. of ethyl ether, the irradiation of ultraviolet ray was carried out for 90 minutes and 15 ml. of acetone was used instead of 50 ml. of ethanol. As a result, 2.7 g. of yellow oily matter containing vitamin $D_3$.

The content of vitamin $V_3$ in the yellow oily matter was 30% by weight.

EXAMPLE 4

Example 2 was repeated except that 600 ml. of n-hexane was used instead of 1,500 ml. of ethyl ether and the irradiation of ultraviolet ray was carried out for 7 hours. As a result, 19.4 g. of yellow oily matter containing 40.2% by weight of vitamin $D_3$ was obtained.

EXAMPLE 5

Example 4 was repeated except that 600 ml. of isopropyl ether was used instead of 600 ml. of n-hexane and the irradiation of ultraviolet ray was carried out for 4.5 hours instead of 3 hours. As a result, 44.2 g. of yellow oily matter containing 43.5% by weight of vitamin $D_3$.

EXAMPLE 6

Example 1 was repeated except that 10 g. of 7-dehydrocholesteryl acetate was used instead of 5 g. of it, 1,000 ml. of benzene was used instead of 500 ml. of n-hexane and the irradiation of ultraviolet ray was carried out for 120 minutes instead of 80 minutes. As a result, 6.1 g. of yellow oily matter containing 35.1% by weight of vitamin $D_3$.

In these examples, the content of vitamin $D_3$ in the yellow oily matter was quantitatively determined according to the method of Hanewald et al. [K. H. Hanewald et al. "Journal of Pharmaceutical Science" 57, 1308 (1968)].

What we claim is:

1. A process for the production of a mixture containing vitamin $D_3$ wherein a solution of 7-dehydrocholesterol organic acid ester in an organic solvent is irradiated with ultraviolet ray to obtain a mixture containing previtamin $D_3$ organic acid ester and then said mixture containing previtamin $D_3$ organic acid ester is subjected to a saponification and heating operation to obtain a mixture containing vitamin $D_3$.

2. A process according to claim 1 wherein 7-dehydrocholesteryl acetate is used as the 7-dehydrocholesterol organic acid ester.

3. A process according to claim 1 wherein 7 - dehydrocholesteryl benzoate is used as the 7-dehydrocholesterol organic acid ester.

4. A process according to claim 1 wherein n-hexane is used as the organic solvent.

5. A process according to claim 1 wherein isopropyl ether is used as the organic solvent.

6. A process according to claim 1 wherein the saponification operation is firstly carried out and the heating operation is secondly carried out and vice versa.

References Cited

UNITED STATES PATENTS

| | | | |
|---|---|---|---|
| 2,099,550 | 11/1937 | Windaus et al. | 260—153 |
| 2,030,377 | 2/1936 | Linsert | 260—153 |
| 3,100,783 | 8/1963 | de Wilde et al. | 260—397.2 |
| 3,157,678 | 11/1964 | Rappoldt et al. | 260—397.2 |

HENRY A. FRENCH, Primary Examiner

U.S. Cl. X.R.

204—158